J. P. QUINN.
AUTOMATIC HEAT REGULATOR.
APPLICATION FILED OCT. 31, 1912.
1,061,123.
Patented May 6, 1913.
3 SHEETS—SHEET 3.
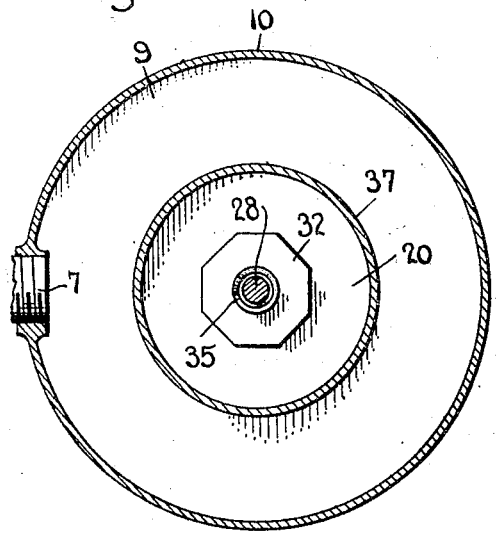
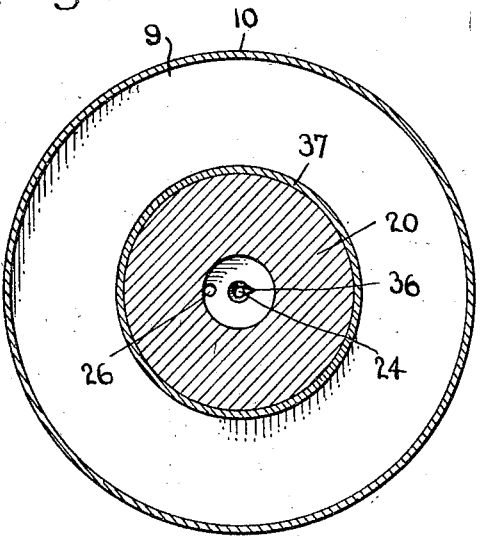
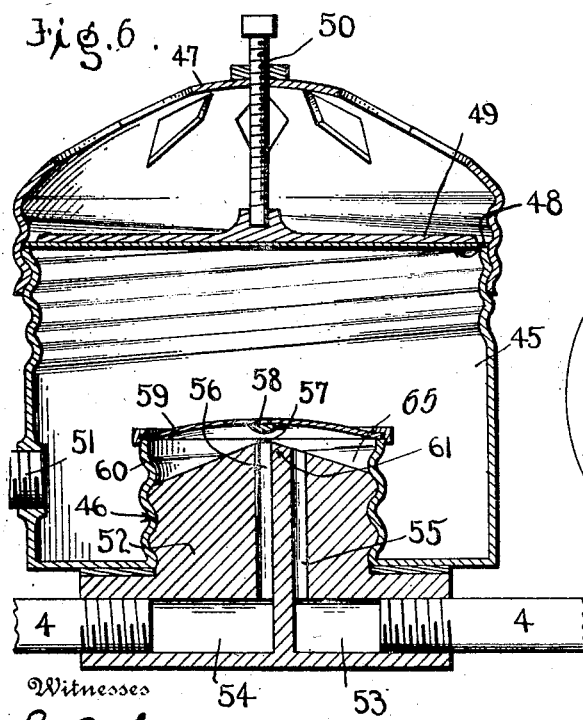
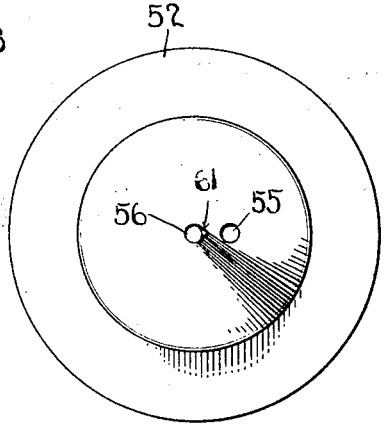
Inventor
John P. Quinn

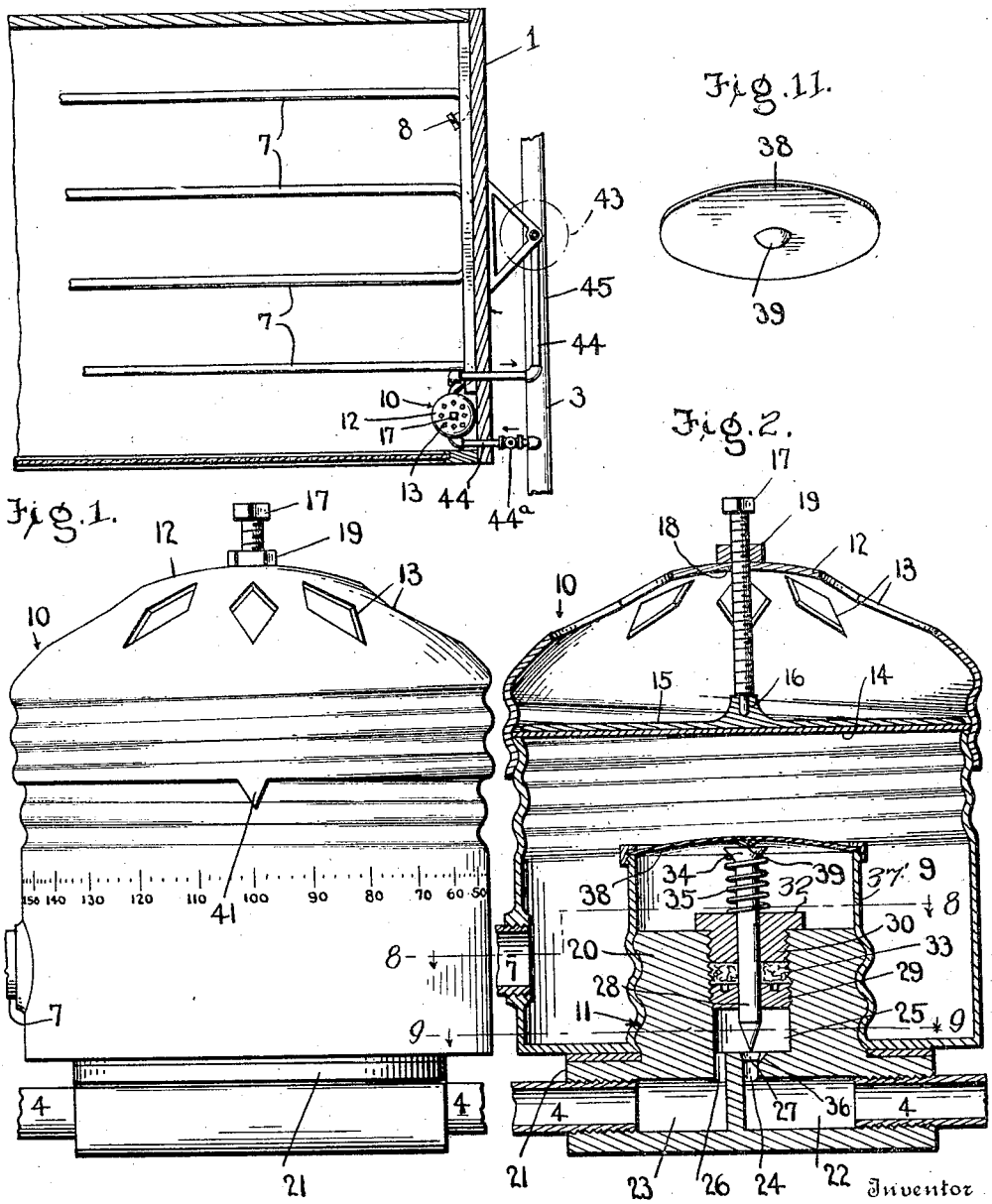

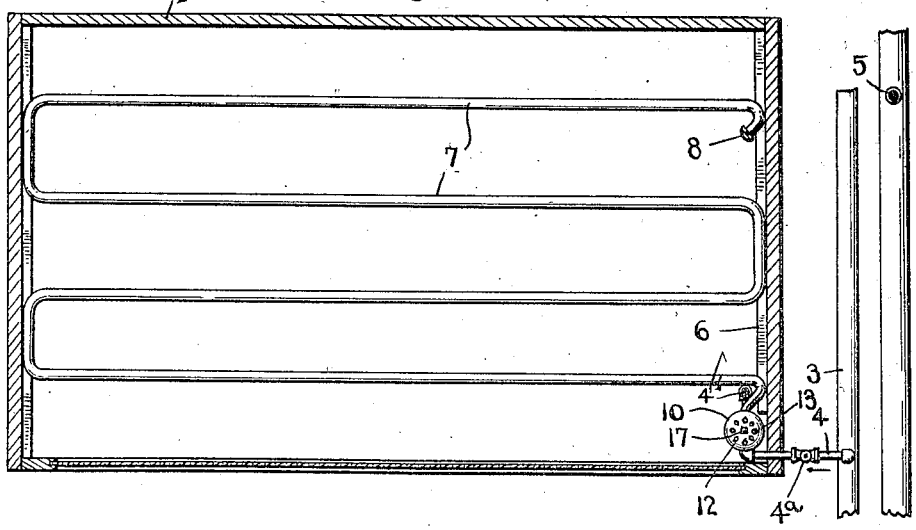
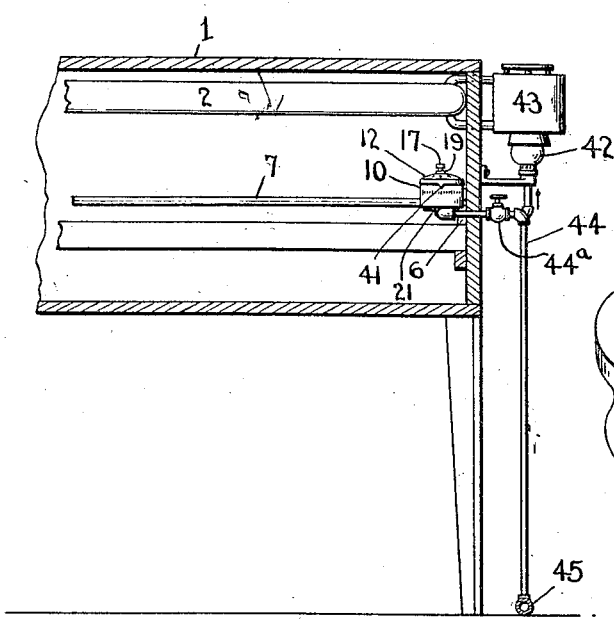
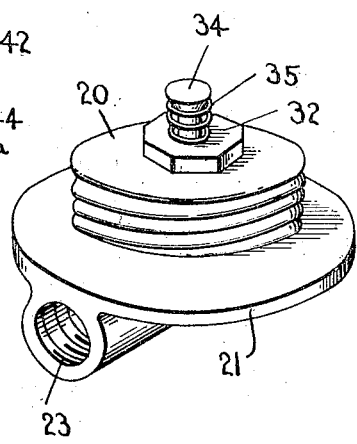

UNITED STATES PATENT OFFICE.

JOHN PAUL QUINN, OF LAWTON, IOWA.

AUTOMATIC HEAT-REGULATOR.

1,061,123.  Specification of Letters Patent.  Patented May 6, 1913.

Application filed October 31, 1912. Serial No. 728,897.

*To all whom it may concern:*

Be it known that I, JOHN PAUL QUINN, a citizen of the United States, residing at Lawton, in the county of Woodbury and State of Iowa, have invented certain new and useful Improvements in Automatic Heat-Regulators; and I do declare the following to be a full, clear, and exact description of the invention, such as will enable others skilled in the art to which it appertains to make and use the same.

This invention relates to improvements in automatic heat regulating devices for incubators, brooders, ovens and the like.

One object of the invention is to provide a regulator of this character by means of which the heat of an incubator, oven or other object to which the same is applied is automatically controlled.

Another object is to provide a regulator of this character which may be employed to directly control the steam, hot water, or other heating medium or to control the fuel supply for the heating apparatus of the object to which the regulator is applied.

A further object is to provide a heat regulator in which the pressure of the heating medium or fuel controlled by the regulator is entirely separate from and can in no way affect the action of the thermostatic valve operating mechanism of the regulator.

Still another object is to provide a regulator of the character described which may be adjusted to reduce or cut off the heating medium or fuel supply when the temperature in the incubator, oven or other object has reached a predetermined degree.

With these and other objects in view, the invention consists of certain novel features of construction, and the combination and arrangement of parts as will be more fully described and claimed.

In the accompanying drawings: Figure 1 is a side view of the regulator. Fig. 2 is a central vertical section thereof. Fig. 3 is a horizontal section of an incubator taken immediately above the thermostatic operating mechanism of the regulator. Fig. 4 is a side view partly in section of a portion of an incubator showing the invention applied thereto and arranged for controlling the fuel supply of the gas lamp which heats the water tank of the incubator. Fig. 5 is a horizontal section of the same. Fig. 6 is an enlarged vertical sectional view of a simplified form of the regulator. Fig. 7 is a plan view of the plug employed in this form. Fig. 8 is a horizontal sectional view taken on the line 8—8 of Fig. 2. Fig. 9 is a similar view taken on the line 9—9 of Fig. 2. Fig. 10 is an enlarged detail perspective view of the plug forming the lower portion of the regulator and having therein the controlling valve for the heating medium or fuel supply of the object to which the regulator is applied. Fig. 11 is a detail perspective view of the valve operating diaphragm.

Referring more particularly to the drawings, 1 denotes an incubator which may be of any suitable construction and which in Figs. 1, 2 and 3 of the drawings is shown as having arranged in the upper end thereof a steam or hot water heating tank 2 in the form of a continuous tube or pipe of suitable size which is arranged around and secured to the inner sides of the incubator as shown. The tank 2 is connected with a main steam or hot water supply pipe 3 by a branch steam or hot water conducting pipe 4 which enters the incubator at a suitable point and is connected with the tank 2 as shown. In the branch supply pipe 4 is arranged my improved regulator which will be hereinafter more fully described and by means of which the supply of steam or hot water to the tank 2 of the incubator is automatically controlled. The tank 2 has also connected thereto an overflow pipe 5 which passes through the incubator casing and is connected at its outer end with a sewer or waste water pipe or extends to a suitable place of discharge. Arranged in the ends of the incubator at points a suitable distance above the egg tray are pairs of parallel, horizontally disposed cleats 6 which are spaced a suitable distance apart to receive the ends of a thermostatic coil 7 which is supported by the cleats in a horizontal position above the egg tray as shown. The coil 7 is adapted to contain mercury, alcohol, or any other suitable expansible fluid, and said coil is closed at one end by a cap 8 and has its opposite end connected with the outer chamber 9 of my improved regulator 10, said chamber being also filled with the expansible fluid contained in the coil 7.

My improved regulator 10 comprises the chamber 9 which may be of any suitable size and shape, the same being here shown and is preferably in the form of a cylindrical can or hollow body having in its lower end a centrally disposed threaded collar 11. The upper end of the chamber or body 9 is threaded and adapted to be screwed onto said threaded upper end of the chamber is a cap 12 having a convex upper side in which are formed openings 13. Secured to or formed integral with the upper end of the body 9 is a flexible or expansible diaphragm 14 which forms a closure for said upper end of the chamber 9 as shown. Arranged in the upper portion of the cap immediately above and resting on the diaphragm 14 is a diaphragm adjusting plate 15 having on its upper side a centrally disposed socket 16 with which is loosely engaged the lower end of an adjusting screw 17. The screw 17 has an operative engagement with a centrally disposed threaded aperture 18 in the top of the cap 12 and is provided on its upper end with a head whereby the screw may be adjusted to force the plate or disk 15 and the diaphragm 14 downwardly to a greater or less extent, thereby slightly reducing the size of the chamber 9. The adjusting screw 17 is locked or fastened in its adjusted positions by a lock nut 19 which is arranged thereon and is adapted to be screwed down into engagement with the top of the cap 12 as shown. By providing the apertures 13 in the top of the cap, air is prevented from accumulating in the upper portion of the cap above the diaphragm 14 and thus interfering with the movement of the latter when the screw 17 is released. By screwing the cap 12 upwardly or downwardly on the body 9, the plate 15 is also moved upwardly or downwardly thereby also varying the pressure of the plate on the diaphragm. This adjustment of the cap and the plate 15 affects the action of the expansible fluid contained in the chamber whereby the latter will operate the controlling valve of the regulator when the temperature of the incubator or other object has reached a predetermined point as will be hereinafter more fully described.

The heating fluid or fuel controlling mechanism of my improved regulator comprises a plug 20 which is adapted to be screwed into the threaded collar 11 in the bottom of the chamber 9 and which projects a suitable distance up into said chamber as shown. On the lower end of the plug is a head 21 in one side of which is formed an inlet passage 22 and in the opposite side of which is formed an outlet passage 23. The passages 22 and 23 are threaded for a suitable distance at their outer ends and with said ends are connected sections of the branch supply pipe 4 which conducts the steam or hot water from the main supply pipe to the heating tank of the incubator as shown in Figs. 1, 2 and 3 of the drawings, or to which may be connected a branch fuel supply pipe as shown in Fig. 4 of the drawings and which will be hereinafter more fully described. The inner end of the inlet passage 22 communicates with a reduced inlet port 24 which opens at its upper end into an inner chamber 25 formed in the center of the plug 20. The inner end of the inlet port 24 forms a seat 27 for a fluid controlling valve 28 which is in the form of a pin and has a tapered inner end which engages the seat 27 and closes said port to a greater or lesser extent thus regulating the flow of the fluid passing through the branch supply pipe connected with the passages 22 and 23. The inner end of the outlet passage 23 communicates through a port 26 with said chamber 25. The valve 28 is slidably supported in the center of the chamber 25 by an inner guide ring 29 and an outer guide ring 30 said rings being externally threaded and adapted to be screwed into the chamber 25 which is also threaded to receive the same. The inner ring 29 has formed in its upper side recesses 31 with which is adapted to be engaged a spanner wrench or other tool whereby the ring 29 is screwed into position. The outer ring 30 is provided with a squared, flanged head 32 whereby a wrench may be applied to this ring for screwing the same into position. Between the rings 29 and 30 is arranged a suitable packing 33 which prevents any leakage of the fluid passing through the chamber 25. On the outer end of the valve 28 is a head 34 between which and the outer end of the ring 30 is arranged a light coiled spring 35, the pressure of which is applied to the valve to lift and disengage the inner end thereof from the valve seat 27 and to yieldingly support said valve in an open position. In one side of the valve seat 27 is formed a small notch 36 which provides a by-pass and prevents the valve 28 from entirely closing the passage 24 thus permitting a small quantity of fluid to pass continuously through the branch pipe to the heating mechanism of the incubator or to the lamp as the case may be.

On the inner end of the threaded collar 11 is an upwardly projecting annular flange 37 to the upper edge of which is secured a flexible valve operating diaphragm 38 on the inner side of which is arranged a centrally disposed stud 39 which engages the head 34 of the valve 28 and which when the mercury or other expansible fluid in the outer chamber 9 of the regulator and in the coil 7 expands under an increased heat in the egg chamber of the incubator or in the brooder, oven or other object to which the regulator is applied, will force the valve 28 downwardly to a more or less closed position thereby regulating the size of the port 24 and controlling the flow of the fluid through the chamber 25 as will be readily understood. As soon as the temperature of the incubator is reduced and the expansive fluid in the coil 7 and chamber 9 contracts, the spring 35 will raise the valve and again open the port 24.

By arranging the diaphragm 38 and the valve 28 as herein shown and described it will be seen that the pressure of the fluid passing through the chamber 25 will not offer any resistance to or affect the operation of the valve 28 by the pressure of the expansible fluid in the chamber 9 of the regulator so that the full action or effect of this fluid will be applied to the diaphragm 38 which is also unaffected by any back pressure of the fluid passing through the chamber 25 as said chamber is entirely cut off from the space between the diaphragm and the inner end of the plug 20 by the guide rings 29 and 30 and the packing 33 hereinafter described.

By screwing the cap 12 down on the chamber 9 of the regulator to a greater or less extent or adjusting the plate 15 in the manner described, the size or capacity of the chamber is more or less reduced thus causing the expansive fluid in the chamber to act more or less quickly on the diaphragm 38 or, in other words, when the cap is screwed down on the chamber 9, the fluid therein and in the coil 7 will expand and depress the diaphragm 38 before the temperature in the incubator or oven has increased to a very high degree, and by this means it will be seen that the valve 28 may be caused to close when the temperature in the incubator or oven has reached any predetermined degree. In order to adjust the cap to the desired position for causing the valve to close at the desired degree of temperature a graduated scale of degrees is arranged around the outer side of the body 9 and the cap 12 is provided with an indicating finger 41 which is adapted to be brought opposite to the desired degree by screwing the cap down to a greater or lesser extent. The pressure of the expansible fluid in the chamber 9 is also controlled independently of the movement of the cap by the plate or disk 15 and the plate adjusting screw 17 by means of which the diaphragm 14 is depressed or forced downwardly in the manner described. The plate or disk 15 also protects the diaphragm 14 against rupture from undue pressure which might be applied thereto from excessive expansion of the fluid in the chamber 9.

In Figs. 4 and 5 of the drawings, the regulator is shown as being applied to an incubator for controlling the supply of fuel to the gas lamp 42 which heats the boiler 43 forming part of the heating apparatus of the incubator as shown. In this arrangement of the regulator the same is constructed in exactly the same manner as shown and described in connection with the arrangement shown in the first figures of the drawings except that instead of the branch water or steam conducting pipes 4 being connected with the passages 22 and 23 of the regulator a branch fuel supply pipe 44 is shown in this instance as being connected with said passages 22 and 23, said branch pipe being connected at one end with a main gas supply pipe 45 and at its opposite end with the burner of the lamp 42. By arranging the regulator in the branch fuel supply pipe 44 as shown, it will be seen that the supply of fuel to the lamp is automatically controlled by the increase or decrease of the temperature in the egg chamber of the incubator which temperature expands the fluid in the coil and expansion chamber of the regulator as hereinbefore described. The branch steam or hot water supply pipe 4 is provided adjacent to its connection with the regulator with a cut off valve 4$^a$ while the branch fuel supply pipe is provided with a similarly arranged cut off valve 44$^a$ whereby steam or the fuel may be positively cut off from the incubator when desired.

In Fig. 11 of the drawings is shown a simplified form of a heat regulator, the same being shown in this instance as consisting of an outer expansion chamber 45 having in its bottom a centrally disposed threaded collar 46 and having on its opposite end an adjustable cap 47. On the chamber 45 is a flexible diaphragm 48 which closes the upper end of the chamber as shown and acts in the same manner as described in connection with the first form of the regulator. The diaphragm 48 has engaged therewith a regulating plate or disk 49 which is provided with an adjusting screw 50 arranged in the cap 47 for the purpose of adjusting the diaphragm 48 and thus regulating the size of the chamber 45 as previously described. With the chamber 45 is connected one end of a thermostatic coil 51 in which and in the chamber 45 is placed an expansive fluid for controlling the regulating mechanism of the device. Engaged with the threaded collar 46 in the bottom of the chamber 45 is a valve plug 52 in one side of the outer end of which is an internally threaded inlet passage 53 and in the opposite side is formed a similarly arranged outlet passage 54. The passage 53 connects at its inner end with an inlet port 55 the inner end of which opens through the inner end of the plug. The inner end of the outlet passage 54 communicates with a discharge port 56 formed in an opening through the upper end of the plug 52 as shown. The upper end of the port 56 forms a valve seat 57 with which is engaged a valve 58 arranged on the under side of a valve operating diaphragm 59 which is secured to and supported above the inner end of the plug by an annular flange 60 formed on and projecting upwardly from the inner end of the collar. The flange 60 and diaphragm 59 form an inner chamber 65 with which the inlet and discharge ports 55 and 56 communicate and through which the fluid passes from one port to the other. In one side of the valve seat 57 is formed a notch 61 which prevents the valve 58 from entirely closing the port 56 and thus entirely stopping the passage of the fluid through the regulator. With the passages 53 and 54 are connected the sections of the branch conducting pipe for heating the fluid or fuel supply of the incubator, oven; or other object to which this form of the regulator is applied.

In the operation of the form of regulator shown in Fig. 11 of the drawings, it will be seen that the expansion of the fluid in the coil 51 and in the expansion chamber 45 of the regulator will depress the diaphragm 59 and thus engage the valve 58 with the valve seat 57 thereby closing the port 56 to a greater or less extent which will control the passage of the fluid through the regulator and the supply pipe connected thereto.

While I have herein shown and described my improved regulator as being applied to an incubator for controlling the supply of the heating fluid or the supply of the fuel to the lamp, it is obvious that the regulator may be applied to an oven or any other object for controlling the heat therein.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. In an automatic heat regulator, the combination with a cylindrical body externally threaded at its upper end, a cap engaging said threads and having a threaded aperture through its center, a screw adjustable through said aperture, a plate having a socket in which the tip of said screw rests, and a diaphragm beneath said plate and closing the upper end of said body within the cap; of a threaded collar rising from the bottom of said body, a diaphragm closing the upper end of said collar, a thermostatic coil connected with the space between said diaphragms, a threaded plug screwed upwardly into said collar and having inlet and outlet passages connecting with inlet and discharge ports, and a valve regulated by the movements of said lowermost diaphragm for controlling the size of one of said ports.

2. In an automatic heat regulator, the combination with a cylindrical body, a cap adjustably mounted thereon and having an aperture through its center, a screw adjustable through said aperture, a nut on the screw above said cap, a plate having a socket in which the tip of said screw rests, and a diaphragm beneath said plate and closing the upper end of said body within the cap; of a threaded collar rising from the bottom of said body, a diaphragm closing the upper end of said collar, a thermostatic coil connected with the space between said diaphragms, a threaded plug screwed upwardly into said collar and having inlet and discharge ports, a valve regulated by the movements of said lowermost diaphragm for controlling the size of one of said ports, and connections between said ports and the fluid to be regulated.

3. In an automatic heat regulator, the combination with an upright cylindrical body having a threaded collar rising from its bottom and a sleeve rising from the upper end of the collar, a diaphragm secured to the upper end of said sleeve and of lesser diameter than said body, another larger diaphragm closing the top of the body, manually controllable means for adjusting the position of this diaphragm, and a thermostatic coil in communication with the interior of said body; of a plug screwed upward into said sleeve, said plug having lateral passages communicating with the fluid to be regulated and upright ports communicating with said passages and one of the ports having a valve seat at its upper end and a nick in one side of the seat, and a valve actuated by the movements of said smaller diaphragm and coacting with said seat.

4. In an automatic heat regulator, the combination with an upright cylindrical body having a threaded collar rising from its bottom and a sleeve rising from the upper end of the collar, a diaphragm secured to the upper end of said sleeve and of lesser diameter than said body, another larger diaphragm closing the top of the body, manually controllable means for adjusting the position of this diaphragm, and a thermostatic coil in communication with the interior of said body; of a plug screwed upward into said collar, the plug having passages communicating with the fluid to be regulated, upright ports respectively communicating with said passages, and a bore into which one of said ports lead; guide rings mounted in said bore, packing between them, a valve whose stem projects through said rings and packing and whose lower end engages one of said ports while its upper end is engaged by the lowermost diaphragm, and a spring for normally opening said valve.

5. In an automatic heat regulator, the combination with an upright cylindrical body having a threaded collar rising from its bottom and a sleeve rising from the upper end of the collar, a diaphragm secured to the upper end of said sleeve and of lesser diameter than said body, another larger diaphragm closing the top of the body, manually controllable means for adjusting the position of this diaphragm, and a thermostatic coil in communication with the interior of said body; of a plug screwed upwardly into said collar, the plug having an internal chamber and inlet and discharge openings communicating with said chamber and with the fluid to be regulated, packing closing the top of said chamber, and a valve controlling one of said openings and having its stem passing through said packing and engaged by the lowermost diaphragm.

In testimony whereof I have hereunto set my hand in presence of two subscribing witnesses.

JOHN PAUL QUINN.

Witnesses:
 OTIS E. WICK,
 JOHN TEVIS.